United States Patent [19]

Hayashi et al.

[11] Patent Number: 5,699,834
[45] Date of Patent: Dec. 23, 1997

[54] MANIFOLD-TYPE SOLENOID VALVES

[75] Inventors: Bunya Hayashi; Makoto Ishikawa, both of Tsukuba-gun, Japan

[73] Assignee: SMC Corporation, Tokyo, Japan

[21] Appl. No.: 703,549

[22] Filed: Aug. 27, 1996

[30] Foreign Application Priority Data

Oct. 2, 1995 [JP] Japan .......................... 7-278439

[51] Int. Cl.$^6$ ............................................ F15B 13/08
[52] U.S. Cl. ................................ 137/884; 137/271
[58] Field of Search .......................... 137/269, 271, 137/884; 251/129.15

[56] References Cited

U.S. PATENT DOCUMENTS

| 5,333,647 | 8/1994 | Fukano et al. | 137/271 X |
| 5,507,630 | 4/1996 | Hegebarth | 137/271 X |

FOREIGN PATENT DOCUMENTS

| 0 493 972 | 2/1992 | European Pat. Off. . |
| 0 626 521 | 11/1994 | European Pat. Off. . |
| 25 42 284 | 3/1977 | Germany . |
| 28 49 133 | 5/1980 | Germany . |
| 6-109157 | 4/1994 | Japan . |

OTHER PUBLICATIONS

Patent Abstracts of Japan, vol. 018, No. 393 (M-1643), Jul. 22, 1994, JP-A-06 109157, Apr. 19, 1994.

*Primary Examiner*—Kevin Lee
*Attorney, Agent, or Firm*—Oblon, Spivak, McClelland, Maier & Neustadt, P.C.

[57] ABSTRACT

Selective connection of a first pair of output openings or a second pair of output openings opening in different directions with pipe fittings and closing of unused openings with closing plugs are facilitated by the use of a, substantially U-shaped removable stopper pin whose legs are inserted into the corresponding legs of fit-in grooves on both sides of the output openings and engaged with engaging grooves around the periphery of the pipe fittings and closing plugs.

2 Claims, 4 Drawing Sheets

MANIFOLD-TYPE SOLENOID VALVES

FIELD OF THE INVENTION

This invention relates to a manifold-type solenoid valve comprising a series of change-over valves disposed on a manifold.

DESCRIPTION OF THE PRIOR ART

Japanese Provisional Patent Publication No. 109157 of 1994 discloses a manifold-type solenoid change-over valve having five ports. Two output ports are provided in each of the top of valve body and the front of the manifold. These two output ports are each selectively used depending on the disposition and other conditions of the hydraulically operated unit to be controlled by the solenoid change-over valve, thereby permitting selection of the direction in which piping from the output ports are oriented.

This change-over valve is effective in permitting selective use of the two each output ports disposed in two different planes. Practically, however, pipe connection to the necessary output port, closing of unnecessary output ports, and alteration of pipe connection must be done individually. This necessitates much labor, especially when many change-over valves are used together. Therefore, ways to facilitate pipe connection, closing and alteration in the selective use of the two each differently disposed output ports have been desired.

SUMMARY OF THE INVENTION

An object of this invention is to provide means for facilitating connection of a pipe to and closing of the output ports in a manifold-type solenoid valve having two each differently oriented output ports each that can be individually opened and closed to permit outputting hydraulic fluid in the desired direction.

Another object of this invention is to provide means for permitting such pipe connection and port closing using common parts, thereby reducing the number of parts required for piping and closing and reducing manufacturing costs to a minimum.

To satisfy the above requirements, a manifold-type solenoid valve according to this invention essentially comprises a manifold on the top of which are disposed a required number of change-over valves. Common supply and discharge ducts provided in the manifold to communicate with the supply and discharge ports of each change-over valve open in the top surface of the manifold. More than one pair of first output openings individually communicating with a pair of first output ports of each change-over valve through said openings in the top surface are provided in the front surface of the manifold. Each change-over valve has a pair of first output ports and a pair of second output ports communicating therewith in the valve body thereof. The second output ports open in the top of the change-over valve. The action of the solenoid in the valve body switches the connection of the output ports between the supply and discharge ports.

On both sides of the pair of first output openings is provided a fit-in groove, with the distance between the two legs thereof being smaller than the diameter of the first output opening left therebetween. Engaging openings are provided on both sides of the first output openings so that the legs of a substantially U-shaped stopper pin inserted into the corresponding legs of the fit-in groove project into the first output openings. Engaging grooves to catch the legs of the stopper pin inserted into the legs of the fit-in groove and protruding into the first output openings through the engaging openings are provided around the periphery of pipe fittings and opening closing plugs to be fitted in the first output openings. A pair of the second output openings in the change-over valve are of the same diameter as that of the first output openings. As in the case of the first output openings, a fit-in groove with similarly spaced legs to insert a U-shaped stopper pin are provided on both sides of the second output openings. Engaging openings are provided to allow the legs of the stopper pin to project into the second output openings. Pipe fittings or closing plugs are secured in all of the first and second output openings by means of common stopper pins that engage with the engaging grooves provided on the pipe fittings and closing plugs.

The single manifold of the manifold-type solenoid valve according to this invention is formed by assembling a required number of manifold blocks each having a solenoid operated change-over valve mounted on top thereof. Common supply and discharge ducts communicating with the supply and discharge ports of the change-over valve open in the top surface of each manifold block on which the change-over valve is mounted, whereas a pair of first output openings individually communicating with a pair of output ports of the change-over valve through the openings in the top surface of the manifold block are provided in the front surface thereof.

Pipe fittings and closing plugs are selectively fitted to the paired first and second output openings of the manifold-type solenoid valve. The pipe fittings and closing plugs are fastened to the output openings by means of the legs of a stopper pin that engage with the engaging grooves on the pipe fittings and closing plugs when inserted into the legs of the fit-in groove.

This permits eliminating detouring of piping to hydraulic actuator or other driving machines by selecting the appropriate direction of hydraulic fluid output.

The same stopper pins are used with both first and second output openings and both of pipe fittings and closing plugs. Pipe fittings and closing plugs can be easily fitted, removed or changed by inserting the legs of the stopper pins into the legs of the fit-in groove and pulling them out therefrom.

Relatively free spaces available in front of the manifold block and on top of the change-over valve permits easy fitting, removal and changing of pipe fittings and closing plugs.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENT

Figure 1:
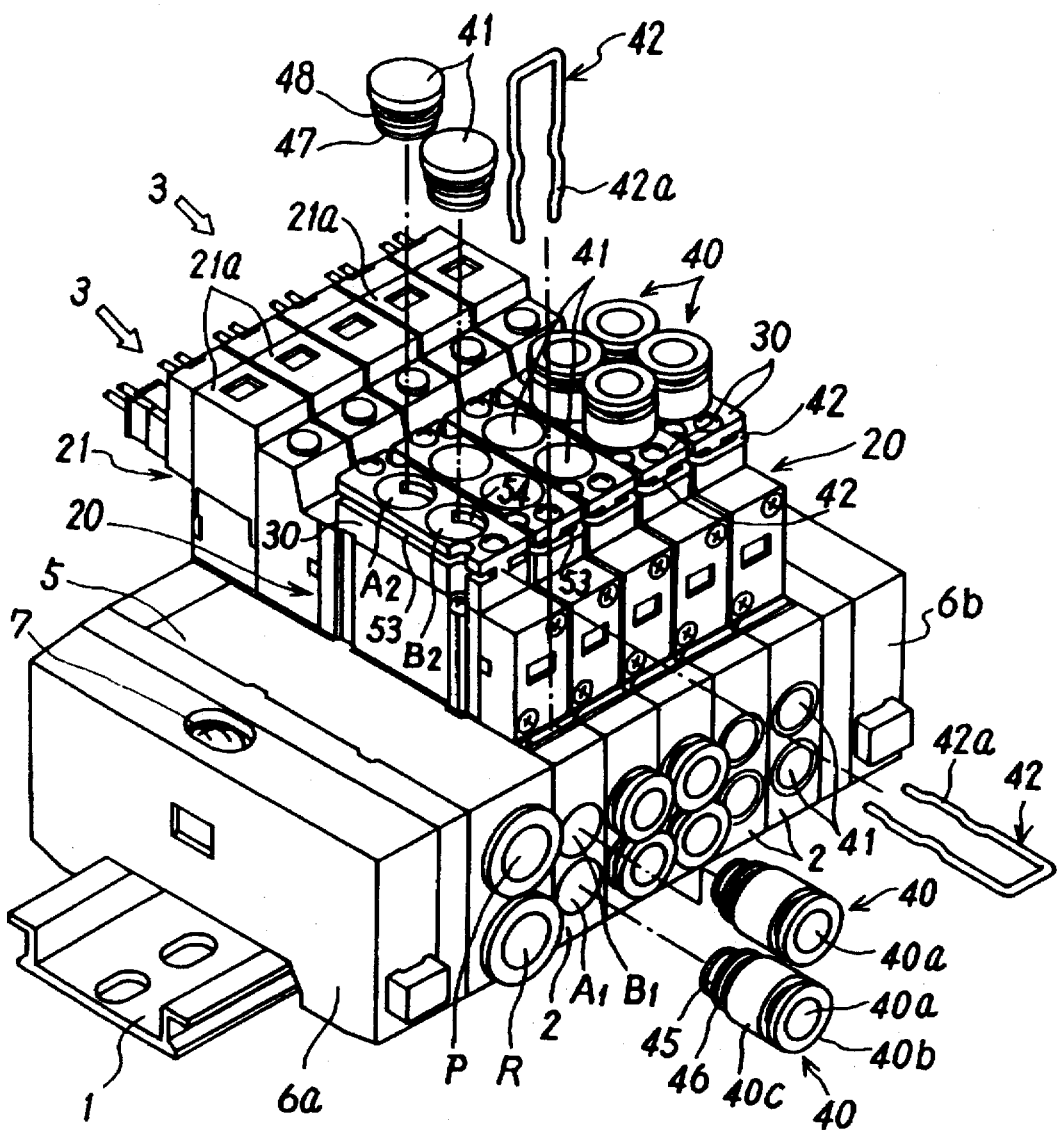
FIG. 1 is a perspective view of a manifold-type solenoid valve embodying the principle of this invention.

FIG. 1 shows a preferred embodiment of this invention. This manifold-type solenoid valve comprises a plurality of units (five units are assembled in the illustrated example), each unit comprising a manifold block 2 and a solenoid operated change-over valve 3 mounted on the manifold block 2 by means of fastening bolts 4, assembled along a rail 1. An end block 6a is fitted to one end of the assembled manifold blocks 2, with a supply and discharge block 5 disposed therebetween, whereas an end block 6b is directly fitted to the other end. The end blocks 6a and 6b are fastened to the rail 1 by means of fastening bolts 7 (FIG. 1 shows only one of the fastening bolts).

The illustrated manifold is formed by assembling a required number of manifold blocks 2, a supply and discharge block 5 at one end, and end blocks 6a and 6b at both ends that are mounted on the rail 1. All member units may be fabricated in one piece, or the manifold blocks 2 may be fabricated as one manifold.

The manifold block 2 has a supply duct 11 to convey compressed air or other hydraulic fluid, a pair of discharge ducts 12a and 12b, and a pair of pilot discharge ducts 13a and 13b, all extending in the direction in which manifold blocks are joined together. The ducts in each manifold block 2 communicate with the ducts in other manifold blocks 2 that are assembled, with the leakage of the hydraulic fluid conveyed therethrough prevented by means of seals, not shown, provided between the individual blocks. The supply duct 11, discharge ducts 12a and 12b, pilot discharge ducts 13a and 13b are closed by end blocks 6a and 6b at both ends of the assembled blocks. The supply duct 11 communicates with a supply opening P in the front surface of the supply and discharge block 5, whereas the discharge ducts 12a and 12b and the pilot discharge ducts 13a and 13b communicate with a discharge opening R in the same front surface of the supply and discharge block 5.

In each manifold block 2, the supply duct 11 connects to an opening 14 in the middle of the top surface thereof on which the change-over valve 3 is mounted. Openings 15a and 15b on both sides of the opening 14 connect to first output openings $A_1$ and $B_1$ that are provided, one on top of the other, in the front surface of the manifold block 2. Openings 16a and 16b on both sides of the openings 15a and 15b connect to the discharge ducts 12a and 12b, whereas openings 17a and 17b on both sides of the openings 16a and 16b connect to the pilot discharge ducts 13a and 13b.

The change-over valve 3 is a pilot-type change-over valve comprising a main valve 20 and a pilot valve 21 which is a solenoid-actuated three-port valve. The change-over valve 3 is mounted on the manifold block 2.

The valve casing 23 of the main valve 20 has a valve bore 24 extending in the direction in which the openings in the top surface of the manifold block 2 where the change-over valve is mounted are provided. A supply port 25 opening in the bottom surface of the valve casing 23 and communicating with the opening 14, first output ports 26A and 26B communicating with the openings 15a and 15b, and discharge ports 28a and 28b communicating with the openings 16a and 16b connect to the valve bore 24. Second output ports 27A and 27B individually communicating with second output openings $A_2$ and $B_2$ in a port block 30 fastened to the top surface of the valve casing 23 by means of fastening bolts 31 are provided above and opposite the first output ports 26A and 26B in the valve bore 24.

That end of a valve body 33 slidably fitted in the valve bore 24 which is closer to the pilot valve 21 is in contact with a piston 34 having a sufficiently larger diameter. When the pilot valve 21 outputs the pilot fluid from the pilot output port to a pilot chamber 35 behind the piston 34, the piston 34 moves to cause the valve body 33 to slide to the right in FIG. 2, thereby connecting the supply port 25 to the output ports 26A and 27A and the output ports 26B and 27B to the discharge port 28b. When the pilot fluid is discharged from the pilot chamber 35, the fluid pressure constantly acting on the pressure chamber opposite the pilot valve through a supply passage 36 communicating with the supply port 25 causes the valve body 33 to slide to the left in FIG. 2, thereby connecting the supply port 25 to the output ports 26B and 27B and the output ports 26A and 27A to the discharge port 28a.

The pilot valve 21 is a three-port solenoid valve of a known type having a pilot supply port connecting to the supply passage 36, a pilot output port connecting to the pilot chamber 35 behind the piston 34, and a pilot discharge port connecting to a pilot discharge passage 29 in the valve casing 23. Energization and de-energization of a solenoid 21a switches the connection of the pilot output port from the pilot supply port to the pilot discharge port and vice versa.

The pilot discharge passage 29 in the valve casing 23 of the change-over valve 3 is provided to communicate with the opening 17a of the pilot discharge duct 13a in the manifold block 2. The opening 17b of the other pilot discharge duct 13b in the manifold block 2, which is closed in the illustration, is used when two pilot valves 21 are attached to both ends of the valve casing 23.

The first output openings $A_1$ and $B_1$ in the manifold block 2 and the second output openings $A_2$ and $B_2$ in the port block 30 are all of the same diameter. Therefore, the same pipe fittings 40, closing plugs 41 and stopper pins 42 can be used with the first output openings $A_1$ and $B_1$ and the second output openings $A_2$ and $B_2$. The pipe fitting 40 is a pipe fitting of a known one-touch type that automatically achieves engagement of a piping tube when the tube is inserted in the connection port 40a thereof. The engagement of the piping tube is released when a release bushing 40b is depressed. A seal ring 45 to seal the gap between the outer surface of the cylindrical part 40c inserted and the output openings and an engaging groove 46 to catch the stopper pin 42 are provided around the periphery of the cylindrical part 40c.

The plugs 41, which have the same diameter as the pipe fittings 40, is used for closing unused output openings. The plugs 41 have a seal ring 47 and an engaging groove 48 therearound like the pipe fittings 40.

Figure 2:
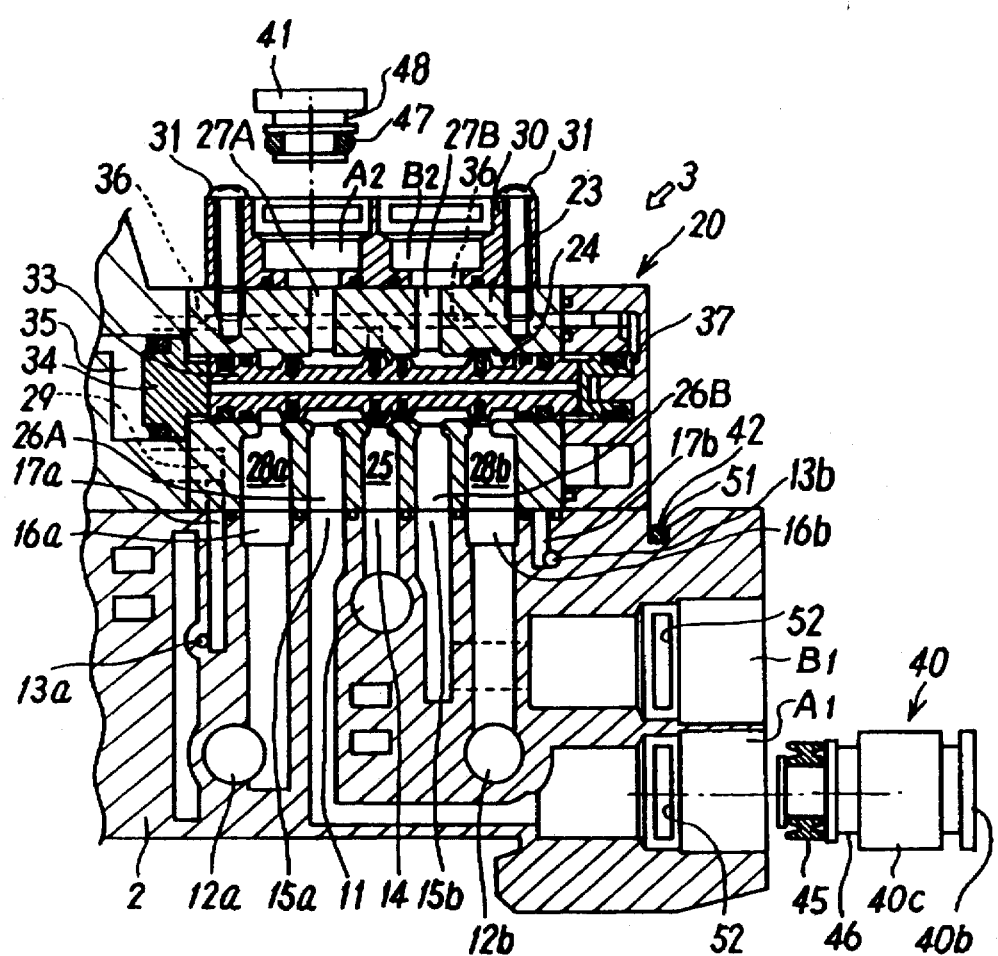
FIG. 2 is a vertical cross-sectional view showing the principal parts of the same embodiment.
Figure 3:
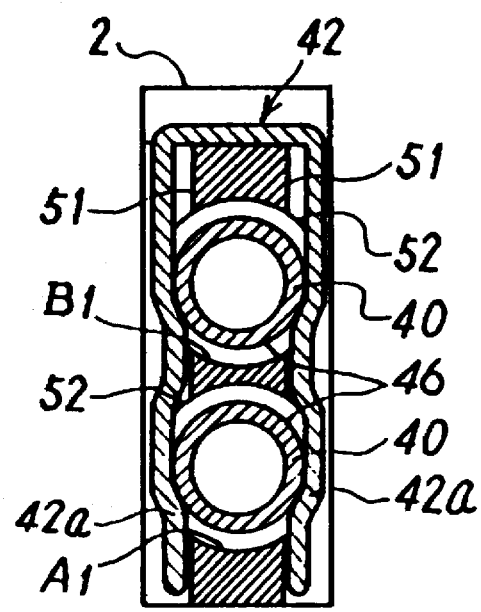
FIG. 3 is a cross-sectional view illustrating how pipe fittings and closing plugs are fitted to the first output openings of the same embodiment.

As is obvious from FIGS. 1 to 3, an inverted U-shaped fit-in groove 51 extending downward on both sides of the manifold block 2 from the top surface thereof is provided so that the legs thereof run down on both sides of the first output openings $A_1$ and $B_1$ in the manifold block 2. The fit-in groove 51 accommodates a substantially U-shaped stopper pin 42 of elastic metal wire. The distance between the legs of the fit-in groove 51 is smaller than the diameter of the first output openings $A_1$ and $B_1$. An engaging opening 52 through which the legs 42a of the stopper pin 42 inserted in the fit-in groove 51 project into the first output openings $A_1$ and $B_1$ is provided on each side of the first output openings $A_1$ and $B_1$.

The pipe fitting 40 or the closing plug 41 is fitted in the first output opening $A_1$ and $B_1$ by placing the engaging groove 46 or 48 provided on the pipe fitting 40 or the closing plug 41 in the engaging opening 52 and bringing the legs 42a of the stopper pin 42 inserted in the fit-in groove 51 into engagement with the engaging groove 46 or 48 on the pipe fitting 40 or the closing plug 41, with the sealing ring 45 or 47 sealing the gap between the pipe fitting 40 or the closing plug 41 and the output openings $A_1$ and $B_1$.

Figure 4:
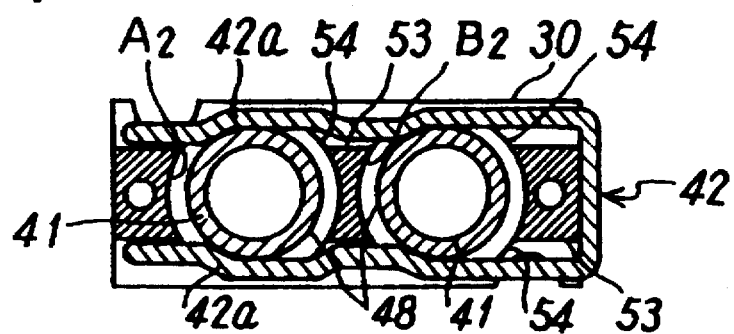
FIG. 4 is a cross-sectional view illustrating how pipe fittings and closing plugs are fitted to the second output openings of the same embodiment.

The port block 30 has a fit-in groove 53 to accommodate the stopper pin 42, with the legs thereof extending on both sides of the second output openings $A_2$ and $B_2$ (see FIGS. 1 and 4). As in the case of the first output openings A1 and B1, the distance between the legs of the fit-in groove 53 is smaller than the diameter of the second output openings $A_2$ and $B_2$. The same pipe fitting 40, closing plug 41 and stopper pin 42 as those used with the first output openings $A_1$ and $B_1$ are used with the second output openings $A_2$ and $B_2$, with the same seal rings 45 and 47 used for sealing.

In the manifold-type solenoid valve described above, the pipe fittings 40 and closing plugs 41 are fastened in the first output openings $A_1$ and $B_1$ and the second output openings $A_2$ and $B_2$ by fitting the pipe fittings or closing plugs as required and inserting the stopper pins 42 in the fit-in grooves 51 and 53. Because the pipe fittings 40 and closing plugs 41 can be selectively fitted to the output openings as required using the same stopper pins 42, the change-over valve can be used in various combinations, as will be discussed by reference to the schematic illustrations in FIG. 5.

Figure 5A:
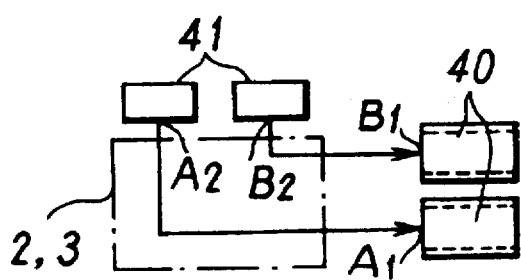
FIGS. 5A–5F shows schematic illustrations of typical applications of the manifold-type solenoid valve according to the invention.

In FIG. 5A, the pipe fittings 40 are fitted in the first output openings $A_1$ and $B_1$ and the closing plugs 41 in the second output openings $A_2$ and $B_2$, using the stopper pins 42. With the second output openings $A_2$ and $B_2$ thus closed by the closing plugs 41, the hydraulic fluid is outputted from the first output openings $A_1$ and $B_1$ in the front surface of the manifold block in which the pipe fittings 40 are fitted. When the closing plugs 41 are fitted in the first output openings $A_1$ and $B_1$ and the pipe fittings 40 are in the second output openings $A_2$ and $B_2$ as shown in FIG. 5B, the hydraulic fluid is outputted from the second output openings $A_2$ and $B_2$ in the top surface of the change-over valve. This freedom of choice in selecting the direction of piping permits direct piping to the nearby hydraulically operated machine to be controlled by the change-over valve 3 without wasteful detouring.

Figure 5D:
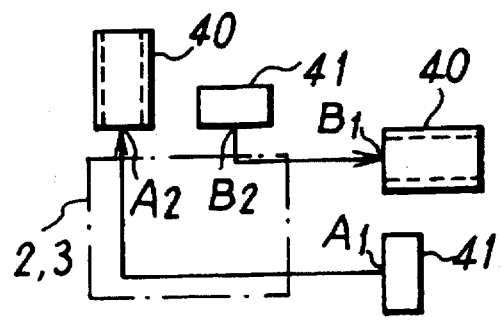
Figure 5B:
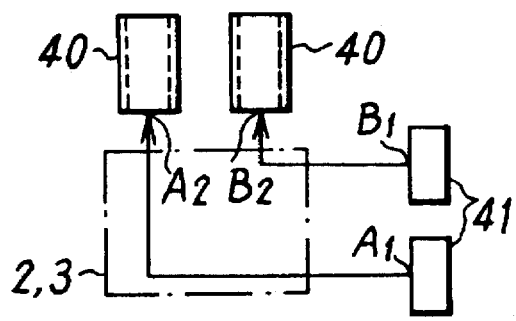
Figure 5E:
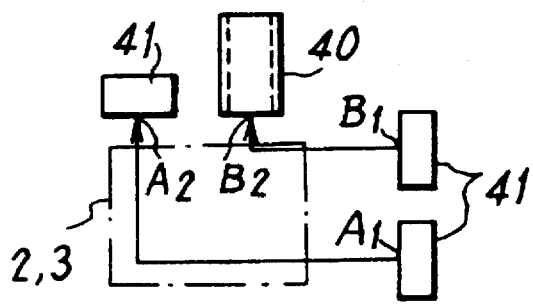
Figure 5C:
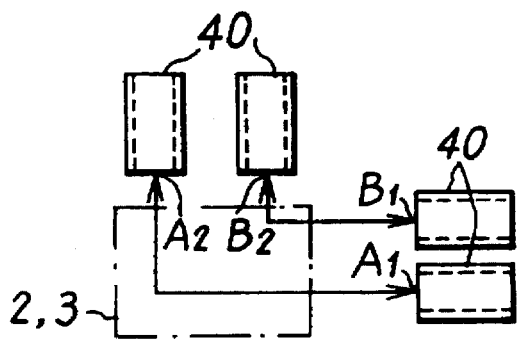

When the pipe fittings 40 are fitted in all output openings $A_1$, $B_1$, $A_2$ and $B_2$ as shown in FIG. 5C, the hydraulic fluid is outputted from the front of the manifold block and the top of the change-over valve. Thus, the output of one change-over valve is bisected.

In FIG. 5D, the pipe fittings 40 are fitted in the first output opening $B_1$ and the second output opening $A_2$ and the closing plugs 41 in the first output opening $A_1$ and the second output opening $B_2$. The hydraulic fluid is outputted from the first output opening $B_1$ in the front of the manifold block and the second output opening $A_2$ in the top of the change-over valve. Thus, the hydraulic fluid can be outputted from any desired output openings by fitting the pipe fittings 40 or closing plugs 41 in the desired output openings.

Figure 5F:
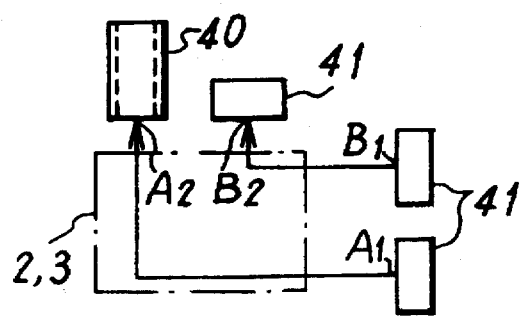

The change-over valve 3 becomes a normally open three-port valve when the closing plugs 41 are fitted in the first output openings $A_1$ and $B_1$ and the second output opening $A_2$ and the pipe fitting 40 in the second output opening $B_2$ as shown in FIG. 5E. The change-over valve 3 becomes a normally closed three-port valve when the closing plugs 41 are fitted in the first output openings $A_1$ and $B_1$ and the second output opening $B_2$ and the pipe fitting 40 in the second output opening $A_1$ as shown in FIG. 5F. The same result is obtained when the pipe fitting 40 is fitted in the first output opening $B_1$ or the first output opening $A_2$ alone.

The pipe fittings 40 and closing plugs 41 can both be fitted in and detached from the first output openings $A_1$ and $B_1$ and the second output opening $A_2$ and $B_2$ by inserting the same stopper pins 42 into the fit-in grooves 51 and 52 and withdrawing the stopper pins therefrom. Thus, the pipe fittings 40 and closing plugs are easy to replace and change. Furthermore, replacement and changing can be accomplished with ease in the relatively free space in front of the manifold block or above the change-over valve.

The required number of change-over valves can be assembled on the rail 1 with one or more combinations of the pipe fittings 40 and closing plugs 41. The same change-over valves 3 can be converted into various combinations of five-port change-over valves, normally open and closed three-port valves, as desired.

Furthermore, this invention is by no means limited to the five-port changer-over valve having the main valve 20 and the solenoid operated pilot valve 21, but is also applicable to direct-acting change-over valves whose valve body is directly actuated by the energization and de-energization of the solenoid.

As discussed above, each manifold-type solenoid valve according to this invention has two differently oriented output ports that can be individually opened and closed to permit outputting the hydraulic fluid in the desired direction. The manifold-type solenoid valve of this invention facilitates the pipe connection to and closing of the output ports, using common parts. This permits reducing the number of parts required for piping and closing, thereby reducing manufacturing costs to a minimum.

What is claimed is:

1. A manifold-type solenoid valve, comprising:

a manifold holding a plurality of change-over valves on a top portion thereof and having common supply and discharge ducts communicating through the manifold with supply and discharge ports respectively of change-over valve openings in a top portion thereof and a pair of first output openings provided in a front surface of the manifold and individually communicating with a pair of first output ports in each change-over valve through said supply and discharge ducts, each of said change-over valves having said pair of first output ports and a pair of second output ports communicating therewith in a valve body thereof, with the second output ports opening in the top portion of the change-over valves, and a solenoid actuating said valve body and switching communication of the output ports between the supply ports and said discharge ports:

a first fit-in groove having legs disposed on both sides of the first pair of output openings in the manifold and separated from each other by a distance smaller than a diameter of the first output openings;

a first substantially U-shaped stopper pin having legs which are inserted into the first fit-in groove and which project into the first output openings; and one of a pipe fitting and a closing plug which is fitted into the first output openings and having around a periphery thereof an engaging groove with which the legs of the stopper pin are engageable;

said change-over valve having a second pair of output openings having the same diameter as said first output openings, a second fit-in groove situated on both sides of the second output openings and which have legs;

a second stopper pin positionable in said second fit-in groove and having legs which are separable from each other by the same distance as that between the legs of the first fit-in groove;

wherein said one of said pipe fittings and said closing plug are fitted in each of the first and second output openings by using one of said first and second stopper pins wherein the legs thereof are engageable in the engaging grooves around the pipe fittings and closing plugs.

2. The solenoid valve according to claim 1, wherein said manifold comprising a plurality of manifold blocks having a solenoid-actuated change-over valve positioned thereon, wherein common supply and discharge ducts are communicated through the manifold with the supply and discharge ports in the change-over valve opening in a top portion of each of said manifold blocks and wherein a pair of first output openings are provided in a first surface of each of said manifold blocks and are individually communicated with a pair of first output ports in the change-over valve through said supply and discharge ducts.

* * * * *